United States Patent [19]

Darges et al.

[11] 3,825,212

[45] July 23, 1974

[54] AIRCRAFT HEATING AND VENTILATING SYSTEM

[75] Inventors: Walter Darges, Wayne, Pa.; John J. Karpis, Newark, Del.; George L. Petitgout, Gradyville; Walter G. Witbeck, Media, both of Pa.

[73] Assignee: The Boeing Company, Seattle, Wash.

[22] Filed: July 10, 1973

[21] Appl. No.: 377,982

[52] U.S. Cl. ............... 244/118 P, 55/347, 55/348, 55/457, 236/13
[51] Int. Cl. ........................................... B64d 13/08
[58] Field of Search ....... 244/118 P; 98/1.5; 165/16; 237/12.3 A; 236/13, 49; 55/347, 348, 457

[56] References Cited
UNITED STATES PATENTS

| | | | |
|---|---|---|---|
| 2,095,824 | 10/1937 | McMahan | 236/13 X |
| 2,966,308 | 12/1960 | Jensen | 236/13 X |
| 2,997,240 | 8/1961 | Kreuttner | 236/13 |
| 3,053,454 | 9/1962 | Waterfill | 236/13 |
| 3,394,884 | 7/1968 | Lord | 165/16 X |
| 3,486,435 | 12/1969 | Holt | 98/1.5 |
| 3,611,679 | 10/1971 | Pall | 55/457 |

Primary Examiner—Lloyd L. King
Assistant Examiner—Randolph A. Reese
Attorney, Agent, or Firm—Robert S. Lipton; Joseph M. Corr

[57] ABSTRACT

A heating and ventilating system, for use in aircraft, which provides a constant flow of air to the aircraft cabin is described. Ambient air is mixed with bleed air from the compressor stage of a turbine engine. The mixture of ambient and bleed air is propelled into the aircraft cabin by a constant R.P.M. blower. Prior to entering the cabin the mixed air may pass through a water and particle separator. A suitable control system is provided which maintains a pre-selected temperature by varying the amount of bleed air introduced into the system.

9 Claims, 4 Drawing Figures

3,825,212

AIRCRAFT HEATING AND VENTILATING SYSTEM

BACKGROUND OF THE INVENTION

This invention relates generally to heating and ventilating systems for use in vehicles and in particular aircraft.

In today's aircraft there are many different factors, environmental and otherwise, which influence the design of heating and ventilating systems. One such factor is whether or not the aircraft is required to have a pressurized cabin. If a pressurized cabin is required, the ventilation system must be equipped to take outside ambient air and introduce it into the aircraft cabin at the higher cabin pressure. This requires that a compressor be included in the ventilation system. The degree, or amount of ventilation which is required, is another such factor. The amount of heat and the number of sources available to produce it also have an influencing effect. In some aircraft there are two separate systems while on others they are integrated and combined into a single heating and ventilating system.

It is not unusual in heating and ventilating systems of the prior art for engine compressor bleed air to be used as the source of heat for the heating system. This type of air is generally only available in aircraft having turbine engines. The turbine engine is generally used for propulsion as a jet engine or is adapted to drive a propeller in the case of airplanes or a rotor in the case of helicopters. Another use for such an engine is as an auxiliary power unit commonly referred to as an A.P.U.

In operation, a turbine draws air through its compressor where in the process of being compressed it is heated. The air is then passed into the turbine combustion chamber where fuel is mixed with the air and ignited. The ignited gases then drive a turbine thereby producing rotary motion which is used to drive the propeller, rotor or electrical generator, in the case of an A.P.U.. Since, for obvious reasons, uncontaminated air fit for human habitation is necessary for a ventilation system the air warmed by the compressor stage of the turbine is bled off and used for heating the aircraft cabin.

In some aircraft ventilation systems of the prior art, the bleed air is used in an ejector system. In this type of system the bleed air is injected at high velocity into a tube or duct which is exposed at one end to ambient air. The high velocity bleed air entering this duct creates a pressure differential which draws ambient air into the duct also. The combined mixture is then passed to the aircraft cabin. In this type of system when the engine is cold, large amounts of bleed air are required to obtain the desired cabin temperature. As the engine warms, less and less bleed air is required. This results in the cabin receiving less air for ventilation purposes as with the reduction of bleed air there is a corresponding reduction of ambient air passed to the cabin. Although this system is effective in providing a satisfactory heating system, the ventilation system which is inherently incorporated therein is, therefore, of a type which produces a variable volume of air. This is an undesirable characteristic if constant ventilation characteristics are desired at all times. Another disadvantage of this type of system is the excessive noise level produced by the high velocity air entering the ejector.

The heating and ventilating systems of the prior art are in many instances two separate systems as opposed to a single system. They are complex and costly to manufacture. The ventilation systems generally do not provide that a constant volume of air be supplied to the aircraft cabin. The present invention is a single system which provides heat and constant volume ventilation.

SUMMARY OF THE INVENTION

It is therefore an object of the present invention to provide a new and improved heating and ventilating system for unpressurized aircraft.

It is an additional object of the invention to provide a new heating system and ventilating system for unpressurized aircraft which are integrated into a single system.

It is a further object of the invention to provide a heating and ventilating system for unpressurized aircraft which is a single system and provides the aircraft cabin with a constant volume of air.

It is a still further object of the invention to provide a heating and ventilating system for unpressurized aircraft which supplies the aircraft cabin with a constant volume of air while permitting variation in cabin temperature.

The present invention overcomes the disadvantages of the heating and ventilating systems of the prior art resulting from combining the heating and ventilating systems into a single system. Ambient air is mixed in a chamber or plenum with bleed air from the compressor stage of the aircraft turbine engine. A valve is located in the bleed air duct so that the amount of hot bleed air introduced into the plenum may be controlled. A constant R.P.M. blower draws the mixed air from the plenum into ducting which leads to the aircraft cabin. Thus, a simple and efficient heating and ventilating system is provided which supplies the cabin with a constant supply of air.

BRIEF DESCRIPTION OF THE DRAWINGS

In the drawings which like numerals refer to like parts.

DESCRIPTION OF THE PREFERRED EMBODIMENT

Figure 1:
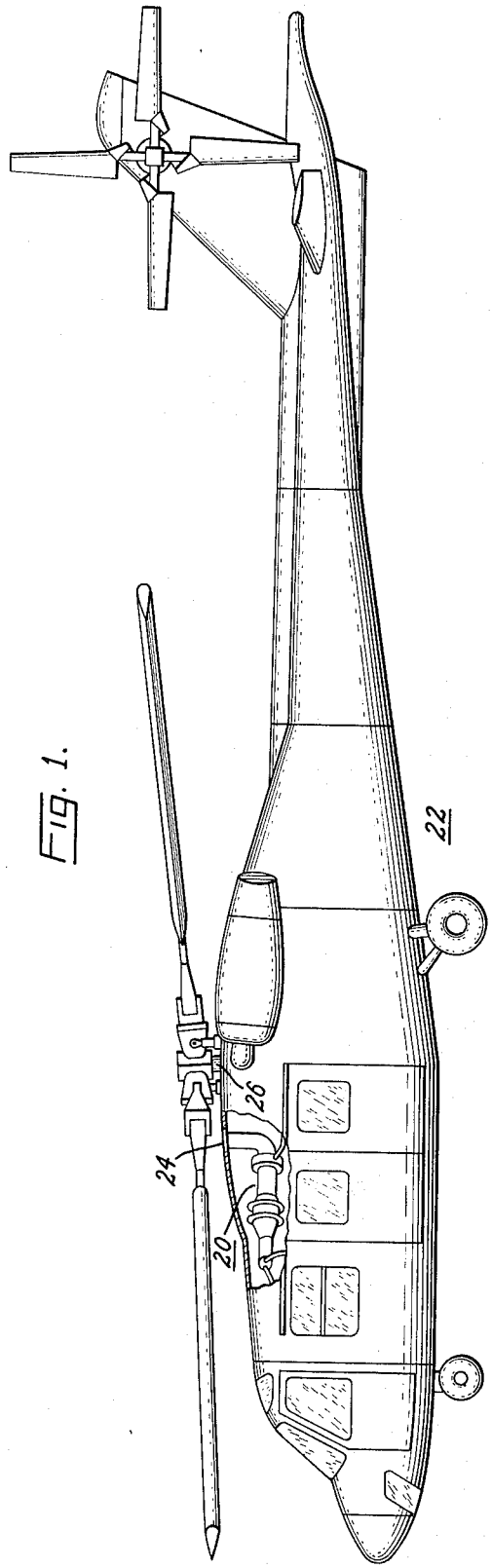
FIG. 1 is a perspective view, broken-away, of a helicopter embodying the invention.

In FIG. 1 the heating and ventilating system 20 is shown installed in the helicopter 22. The ambient air inlet 24 of the system is shown located near the rotor shaft 26 of the helicopter. This location for the inlet duct 24 was chosen as it is an area that is likely to be free from dust and other debris churned into the atmosphere by the helicopter rotor during landing and take-off maneuvers.

Figure 2:
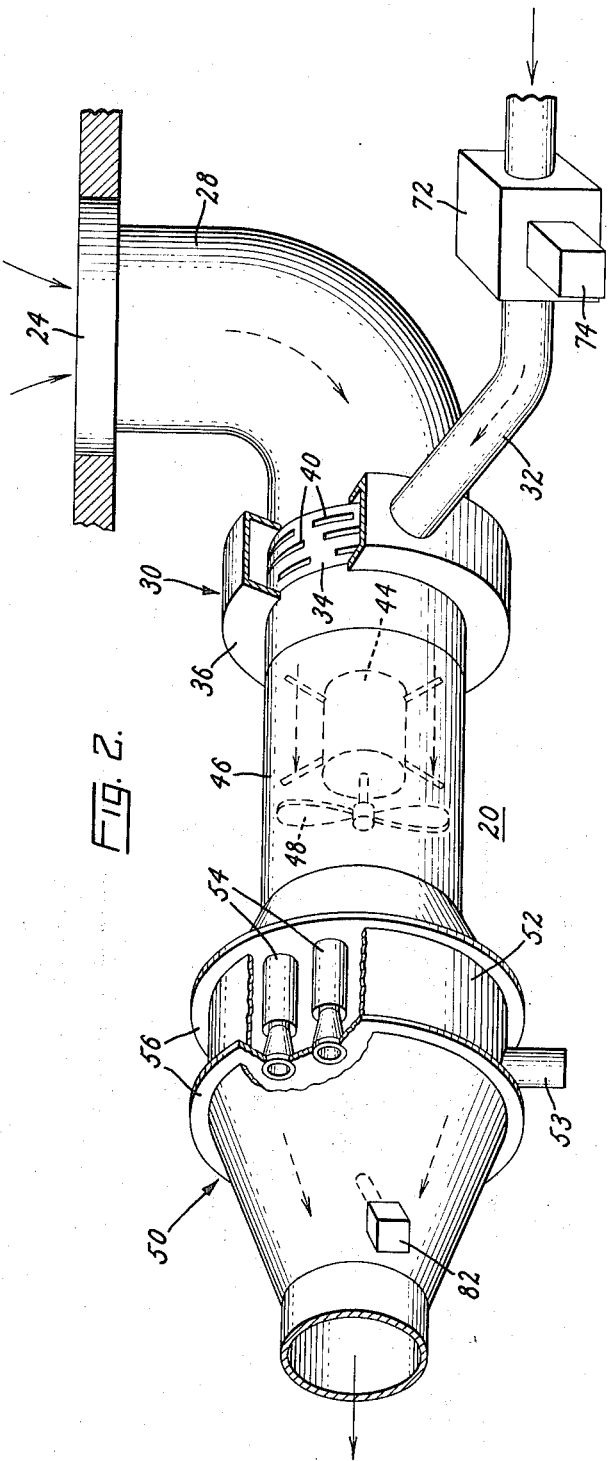
FIG. 2 is a perspective view, broken-away, of the invention.

The details of the heating and ventilating system 20 of the present invention are more clearly shown in FIG. 2. The ambient or outside air enters the system through the inlet 24 where it passes through duct 28 to a plenum or mixing unit 30. Hot engine bleed air enters the mixing unit 30 through duct 32.

The mixing unit 30 is made up of duct 34 and an annular collar 36. The duct 34 is connected upstream to the duct 28, and is enclosed or encompassed by the annular collar 36. The hot bleed air is introduced to the mixing unit from the duct 32 by a hole in the annular collar 36. The hot engine bleed air passes through orifices 40 in the duct 34 where it mixes with the ambient air as it passes through duct 34. The mixing unit is necessary to provide a uniform mixture of ambient and engine bleed air. Without such a mixture regions of hot bleed air would be passed downstream which could cause damage.

A blower is located in duct 46 which is connected to the downstream end of the mixing unit 30. The blower is made up of a constant R.P.M. AC motor 44 and a fan 48. In operation the fan drives the air through the duct 46. It is the use of a constant R.P.M. motor which provides the constant volume airflow.

Before being ducted to the cabin of the aircraft, the air is passed through a water and particle separator 50. As the name implies, it is the function of this device to remove water, dust or other type debris from the air prior to its being passed to the aircraft cabin. As previously indicated, dust and debris are particularly a problem in landing and take-off maneuvers of a helicopter as the downwash from the rotor creates a body of turbulent air about the aircraft. It is for this reason that the air inlet 24 is located in the top of the aircraft as this minimizes the problem. Although this location is beneficial in preventing dust and debris from entering the system, it is susceptible to water entry during flights in rain. Water entry is also a problem when the helicopter hovers, takes off or lands in bodies of water, as water particles are churned into the air in much the same manner as dust in ground landings.

It is for these reasons that a water and particle separator is included in the heating and ventilating system of the present invention.

As shown in FIG. 2, the water and particle separator is made up of a collecting chamber 52. Contained within this chamber are an array of particle separator elements 54. The separator elements are secured within the chamber by end plates 56.

Figure 3:
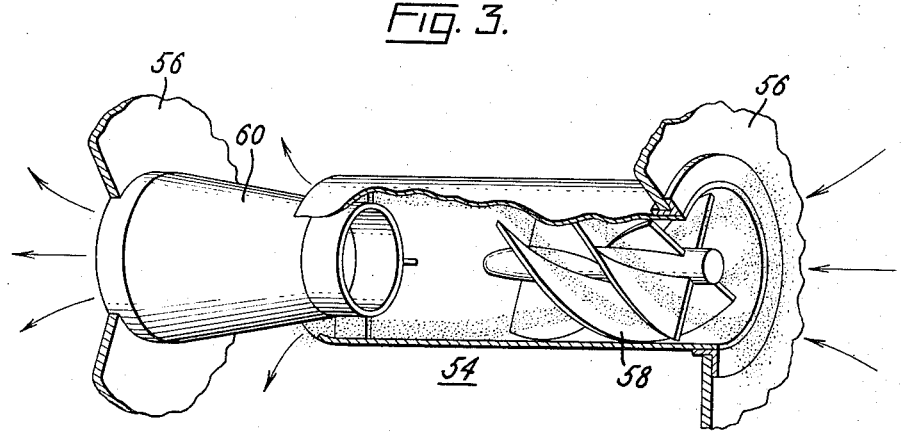
FIG. 3 is a perspective view, broken-away, of a particle separator element.

A perspective view, broken-away, of one of the separator elements 54 is shown in FIG. 3. As the air enters the element 54, it is caused to swirl by vortex generator 58. The swirling motion of the air results in centrifugal force driving particles of water and debris outward towards the wall of the separator element. The particles then fall outside the diameter of the outlet tube 60, thus passing into the collecting chamber 52. The air which passes within the diameter of the inlet orifice of the outlet tube is comparatively free of particles of water and debris and passes from the water and particle separator. The air is then channeled to the aircraft cabin by ducting. If desired, an air filter may be added to the system downstream of the separator to remove any particles which may not have been removed by the separator.

A portion of the air entering the separator is ducted outside the aircraft, thus disposing of the separated debris. This is accomplished by ducting, not shown, attached to a drain duct 53 which forms a part of the collecting chamber 52. As will be understood by those skilled in the art, the type of particle separator just described is conventional and one of many other types may be used with equally satisfactory results without departing from the spirit of the invention herein described.

Figure 4:
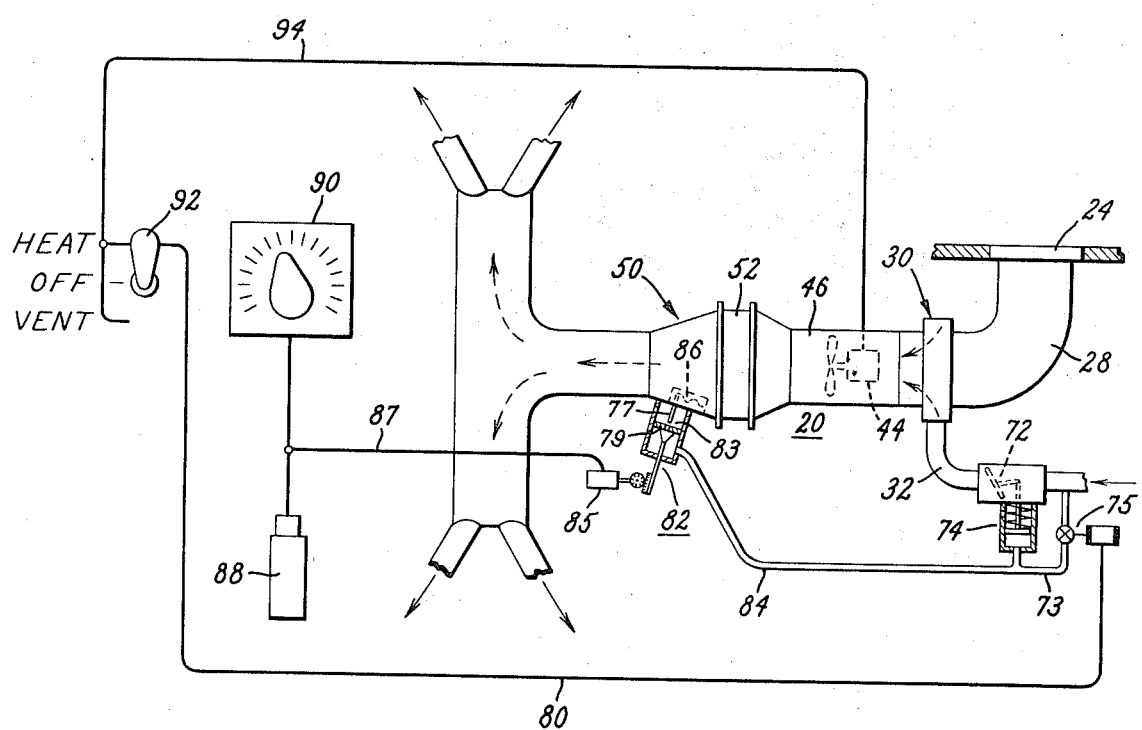
FIG. 4 is a schematic view of the control system of the invention.

Reference will now be made to FIG. 4, where a schematic of the control system for the heating and ventilating system of the present invention is depicted. It is to be understood that there are many different types of control systems which may be used with the heating and ventilating system of the present invention. The particular control system shown here in schematic form is pneumatic in part. There are other control systems which could be used that are completely electrical in nature.

As will be subsequently described in more detail the control system has a switch which has three positions. When the switch is in the heat position the system provides both ventilation and heat, while when the switch is in the ventilate position, ventilation only is provided. Of course, when the switch is in the off position, neither ventilation nor heat is provided to the aircraft cabin. Since the system is open both to the ambient air and to the aircraft cabin at all times, small amounts of air may pass through the ducting thus providing some air exchange between the cabin and the outside atmosphere. This small exchange of air may occur notwithstanding that the control switch is in the off position and is not to be considered "ventilation" as that term is used herein.

As has been previously mentioned, hot bleed air from the turbine engine compressor stage is channeled to the mixing unit 30 by duct 32. The amount of bleed air introduced into the system is controlled by a bleed air control valve 72 which is located in the duct 32. A number of different types of valves may be used for this purpose. One which has been selected for the preferred embodiment of the invention is a conventional butterfly valve, which is commercially available. Connected to the valve is an actuator 74. The actuator moves the valve thereby controlling the flow of air, in response to signals received from other parts of the control system, which will subsequently be described. The actuator may be of either electrical or mechanical. The actuator selected for the preferred embodiment of the invention is mechanical and is of the pneuamtic type.

The actuator 74 receives the fluid pressure which it requires to operate from the bleed air duct 32 through a bypass line 73. Interposed in the bypass line 73 is a solenoid operated valve 75.

The valve actuator 74 is activated as the result of an electrical signal being received by the solenoid operated valve 75 via circuit 80. When the actuator is off, i.e., no signal is sent thereto, the control valve 72 is completely closed, thereby blocking off bleed air entry into the system and thus permitting the cabin to be ventilated entirely by ambient air taken in through inlet 24. A signal along circuit 80 to the valve actuator 74 permits the valve 72 to be opened; however, as will be described, the magnitude of the opening is a function of other factors.

The actuator 74 includes a piston mounted in a cylinder. The piston is mechanically linked to the butterfly valve 72 such that when the cylinder is depressed the valve is opened. The piston is spring loaded so that in the absence or reduction of the depressing fluid pressure on the piston face, the piston will extend, thus driving the butterfly valve to a closed position. Small variations in pressure will partially move the piston and thus the valve 72. The system is designed in this manner, i.e., a loss of pressure results in the closing of the valve 72 for purposes of safety. For instance, in the event the pneumatic line 73 fails or is severed the system inherently stops sending hot engine bleed air into the cabin. The actuator 74 is designed to operate in this manner for purposes of safety. If it operated in the reverse manner, i.e., if a reduction in pressure on the piston face resulted in an open bleed air valve 72, a hazardous situation could arise. As will be described in more detail, the pressure on this piston face is varied by controller 82 which is connected to the actuator 74 by a pneumatic duct. If for any reason this duct was accidentially severed or erroneously caused to be open to cabin air the system would cause maximum heat to be sent to the aircraft cabin resulting in a hazardous condition. This condition is eliminated in the preferred embodiment as a severance of the line 84 of the preferred embodiment results in the valve 72 being closed thus turning off the heat to the aircraft cabin.

Control of the precise degree of opening of the valve 72 is the function of the pressure on the piston face in the actuator 74. The magnitude of this pressure is controlled by the controller 82 which is connected to the actuator 74 and the bypass line 73 by a pneumatic duct 84.

Contained within the controller 82 is a needle valve 83 which includes a plunger 77 and a disc 79 having a hole therein. The plunger 77 is mounted so that movement of it along its longitudinal axis will cause it to be moved in or out of the hole in the disc 79. Both the disc and the plunger are mounted within a housing such that they may each independently move therewithin. The valve is open when the disc is displaced from the plunger permitting air to pass through the hole in the disc. Of course, the valve is closed when the plunger is seated within the hole in the disc thereby preventing air from passing therethrough. The pneumatic duct 84 is connected to the needle valve 83 on the disc side thereof. Axial movement of the disc 79 to and away from the plunger 77 is controlled by an electrical motor 85 which is connected to the disc. When the valve is in the open position, that end of the pneumatic duct 84 is open to the air in the aircraft, thus permitting the pressure in the duct 84 to drop. This in turn causes the pressure to drop in the bypass line connected to the actuator 74. As previously described, this will result in the spring forcing the piston in the actuator 74 to extend thus closing the bleed air valve 72.

The controller 82 varies the pressure in the pneumatic duct 84 in response to one of two inputs. One of these inputs is an electrical signal through circuit 87 which represents the difference between the selected cabin temperature and the actual cabin temperature. The second input is the temperature of the air passing through duct 50. For purposes of safety it is required that the temperature in this duct not exceed a particular value.

The cabin temperature selector 90 and the cabin temperature sensor 88 are both connected to the circuit 87 which is also connected to the electric motor 85. In this manner the electrical signal which is received by the motor represents the difference between selected and actual cabin temperature. As such, the signal may be either positive or negative. By arbitrary convention a positive signal represents a selected temperature which is greater than actual cabin temperature. The magnitude of the signal is directly proportional to the magnitude of the temperature difference. Conversely a negative signal represents a selected temperature which is less than the actual cabin temperature; the magnitude of the signal being proportional to the magnitude of the temperature difference. Thus, if the selected temperature is greater than the actual cabin temperature a positive signal will be sent to the electric motor 85 which is connected to the disc so that it moves the disc to the plunger thus causing a pressure increase in the pneumatic pressure line 84. This in turn will cause the valve 72 to open permitting the hot engine bleed air to pass into the mixing unit from the bleed air line 32. As warm air enters the aircraft cabin the actual temperature will rise towards the selected temperature resulting in a reduction in the magnitude of the signal passing through circuit 87. As the magnitude of the signal decreases the displacement of the disc from the needle valve slowly increases resulting in a partial pressure drop in the pneumatic line 84 and an attendant partial closing of the valve 72. When the actual temperature reaches the selected temperature the magnitude of the signal will be zero. This will result in the disc being displaced at some particular distance from the needle appropriate for that particular temperature condition. Likewise the butterfly valve 72 will be in some partially opened position appropriate for that particular temperature condition. Thus, a stable condition is reached.

Of course, when the selected temperature is less than the actual temperature the system operates to close the bleed air valve 72. This is accomplished as a result of a negative signal being sent along circuit 87 to the electric motor 85. This results in the disc being fully withdrawn from the needle with the result that the pressure in the pneumatic line 84 drops to its minimum level thus permitting the spring to fully close the valve 72.

The controller 82 will also send a pneumatic signal through tube 84 to close the bleed air valve 72 in response to a predetermined maximum temperature sensed by a bi-metal temperature sensor 86.

When this predetermined maximum temperature is reached the bimetal sensor 86 will mechanically move the plunger of the controller 82 away from the disc thus opening the pneumatic line 84. As previously discussed this has the effect of driving the valve 72 to a closed position thus preventing hot bleed air from flowing into the aircraft cabin. The plunger is displaced sufficiently from the disc so that it is impossible for an electrical signal from pathway 87 to drive the disc to the plunger thus opening the bleed air valve 72. It is the function of this temperature sensor 86 to keep the temperature in the ducting leading to the aircraft cabin below a predetermined value for reasons of safety. In the preferred embodiment of the invention, this temperature value has been selected to be 240°F.; i.e., the temperature in the ducting will not be permitted to rise above 240° and if that temperature is reached the controller 82 will cause the actuator 74 to close the bleed air valve 72, thereby terminating the supply of hot engine bleed air to the system. The entire system is connected to a three-way switch 92. The switch is connected to the system in such a manner that when it is in the off position, the actuator 74 maintains the valve 72 in a closed position as a result of a lack of signal being passed to the actuator 74 through conduit 80 which is connected to the switch 92. When the switch 92 is in the ventilate position, a signal is still not sent to the actuator 74 through pathway 80, however, an electrical signal is sent to the blower through electrical pathway 95. In this manner the aircraft cabin is supplied with ventilation but not heat.

When the switch is in the heat position, electrical signals are sent through pathways 94 and 80 thereby actuating both the blower and the actuator 74. In this manner both the ventilation and heating systems are caused to function.

While the invention has been illustrated and disclosed with reference to the preferred embodiment, it is to be understood that various changes and modifications may be made without departing from the spirit of the invention.

What is claimed is:

1. A heating and ventilating system which provides a constant mass flow of air per unit time for use in non-pressurized aircraft having a turbine engine which has a compressor stage, and a cabin, which comprises:
    a first duct having two ends, one end communicating with ambient air;
    a mixing unit connected to the remaining end of said first duct;
    a blower unit including a duct having first and second ends, a fan positioned in said blower duct, and a constant RPM motor connected to said fan for propelling air through said blower duct, said blower unit connected to said mixing unit at said first end of said blower duct so that air may communicate therewith;
    a second duct connected to said blower unit at said second end of said blower duct and to the aircraft cabin so that air may be communicated from the blower unit to the aircraft cabin;
    a bleed air valve connected to the compressor stage of the aircraft turbine engine and to said mixing unit so that air may pass from the compressor stage of the engine to said mixing unit through said valve; and
    a control means for varying the position of said valve in response to the cabin temperature.

2. The heating and ventilating system of claim 1 which further comprises a particle separator, having first and second ends, located between said blower unit and the aircraft cabin by connecting said first end of said particle separator to said second end of said blower duct and connecting said second end of said particle separator to said second duct thereby permitting air to pass through said separator to the aircraft cabin.

3. The heating and ventilating system of claim 2 wherein said particle separator includes a plurality of separator elements each of which include: a vortex generator; a first tube located concentrically about said vortex generator; and an outlet tube located within said first tube, secured with respect thereto, downstream from said vortex generator, said second tube having a smaller diameter than said first tube so that debris carried by air entering said first tube will be thrown outward by centrifugal force with the result that air which enters said second tube will be relatively free of debris.

4. The heating and ventilating system of claim 1 wherein said control means includes safety means for preventing air having a temperature greater than a predetermined value from entering the aircraft cabin.

5. The heating and ventilating system of claim 4 wherein said safety means includes a temperature sensor located in said second duct and means for closing said valve when said sensor detects a temperature exceeding the predetermined value.

6. The heating and ventilating system of claim 4 wherein said control means includes means for temperature selection; means for measuring actual cabin temperature; signal means for generating a signal in response to a difference between selected and actual temperatures, an actuator connected to said bleed air valve and adapted to open and close said valve in response to the signal from said signal generating means whereby the position of said valve is a function of the difference between selected and actual cabin temperature.

7. The heating and ventilating system of claim 6 wherein said control means further includes a valve responsive to said signal means; and wherein said actuator is operated by the bleed air pressure, said actuator having a pneumatic duct passing therethrough, connected to said valve thereby permitting air to communicate therewith; said actuator adapted to be responsive to the pressure in said pneumatic duct thereby causing said bleed air valve opening to be responsive to said valve.

8. The heating and ventilating system of claim 1 wherein said mixing unit includes; a tube, connected at one end to said first duct and connected at its remaining end to said first end of said blower unit, having orifices in said tube uniformly spaced about its circumference; and
    an annular collar encompassing that portion of said tube having orifices therein, said collar being connected to said bleed air valve so that hot engine bleed air may communicate with said blower duct after being substantially uniformly mixed with outside ambient air, the ambient air communicating with said mixing unit through said first duct.

9. A heating and ventilating system for providing substantially constant air flow in non-pressurized aircraft having a cabin and a turbine engine which has a compressor stage, which comprises:
    a first duct having two ends, one end communicating with ambient air;
    a mixing unit connected to the remaining end of said first duct;
    a blower, having a constant R.P.M. motor so as to provide a constant flow of air, connected to said mixing unit so that air may be forced to communicate therewith;
    a second duct connected to said blower unit and to the aircraft cabin so that air may be communicated from the blower unit to the aircraft cabin;
    a bleed air valve connected to the compressor stage of the aircraft turbine engine and to said mixing unit so that the air may pass from the compressor stage of the engine to said mixing unit through said valve; and
    a control means for varying the position of said valve in response to the cabin temperature.

* * * * *